(No Model.) 2 Sheets—Sheet 2.
G. P. PRICE.
SWINGING GATE.
No. 359,740. Patented Mar. 22, 1887.
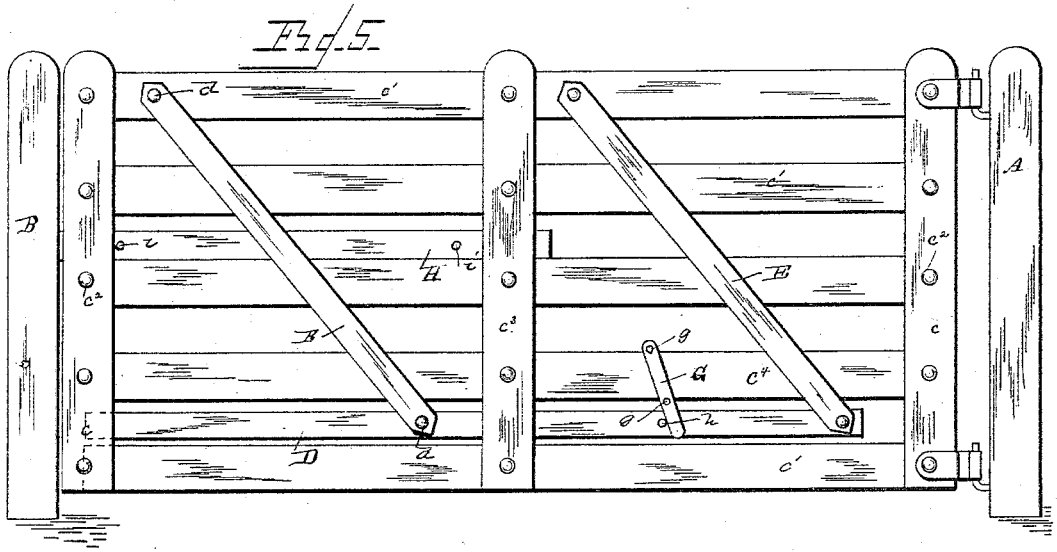
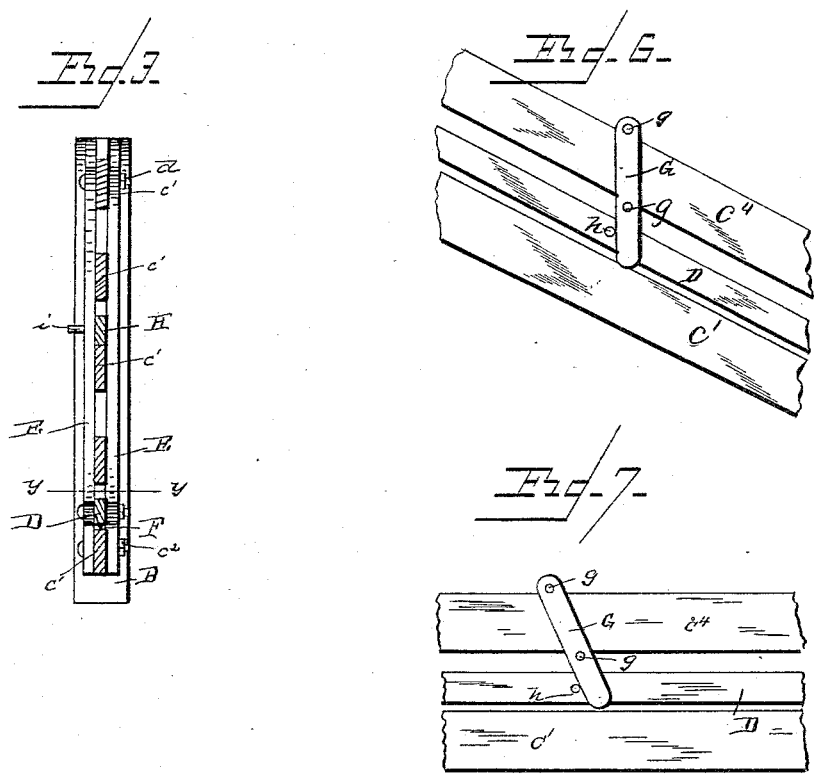
Witnesses
C. E. Doyle
H. Burnham
Inventor
Geo. P. Price
By his Attorney
C. A. Snowles
N. PETERS, Photo-Lithographer, Washington, D. C.

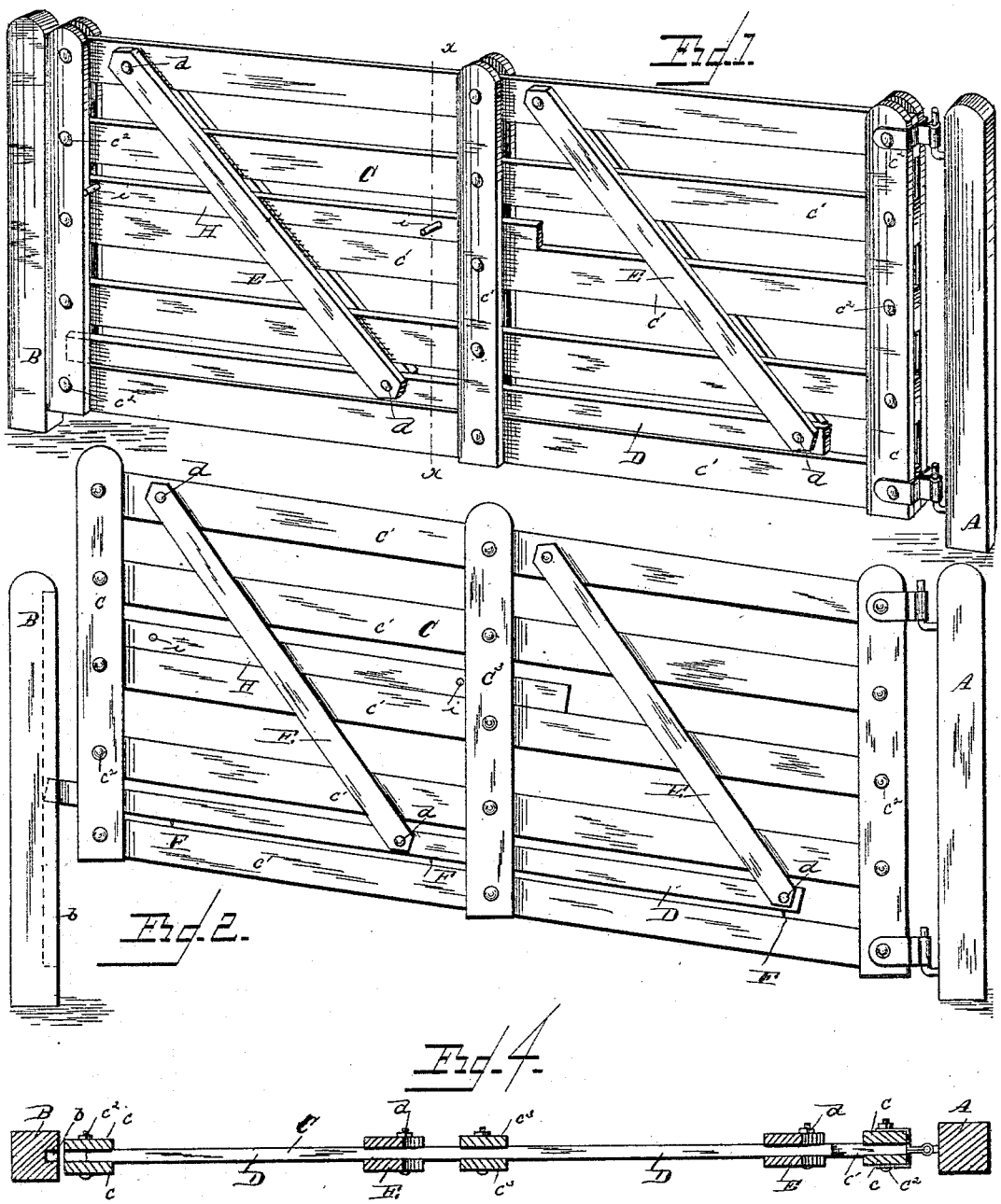

UNITED STATES PATENT OFFICE.

GEORGE P. PRICE, OF CARLISLE, OHIO.

SWINGING GATE.

SPECIFICATION forming part of Letters Patent No. 359,740, dated March 22, 1887.

Application filed October 23, 1886. Serial No. 217,038. (No model.)

*To all whom it may concern:*

Be it known that I, GEORGE P. PRICE, a citizen of the United States, residing at Carlisle, in the county of Warren and State of Ohio, have invented a new and useful Improvement in Swinging Gates, of which the following is a specification.

My invention relates to improvements in swinging gates; and it consists of the peculiar combination of devices and novel construction and arrangement of the various parts for service, substantially as hereinafter fully described, and particularly pointed out in the claims.

The object of my invention is to provide a swinging gate with improved means for locking the same at any desired point of its elevation, the locking device being automatically operated when the gate is lifted or raised, and held in engagement with one of the bars thereof by the weight or heaviness of the structure or the gate itself, and being capable of easy operation to lower the gate, as will be more fully described presently.

My improvement is very simple and strong in construction, effective and reliable in operation, and cheap.

My invention also contemplates the provision of means whereby the gate is held from swinging open when it is held at any desired height for the purpose of allowing the passage of small animals—such as sheep or hogs—beneath the same.

In the accompanying drawings, which illustrate a swinging gate embodying my improvements, Figure 1 is a perspective view showing the gate closed. Fig. 2 is a side elevation of the gate in an elevated position. Fig. 3 is a vertical transverse sectional view of the gate in its closed position on the line $x\ x$ of Fig. 1, and Fig. 4 is a horizontal sectional view on the line $y\ y$ of Fig. 3. Fig. 5 is a side elevation of another form of my invention, showing different auxiliary mechanism for locking the gate against movement when it is raised or elevated. Figs. 6 and 7 are enlarged detail views of the device shown in Fig. 5.

Referring to the drawings, in which like letters of reference denote corresponding parts in all the figures, A designates the hinge-post, B the latch-post set in the ground in line with the hinge-post and having a vertical longitudinal groove, $b$, on its inner face, and C the swinging gate, which is hinged to the hinge-post A, and is adapted to close against the latch-post B, and to be connected therewith to prevent it from accidentally swinging open. This swinging gate C comprises the vertical end bars, $c$, which are arranged in pairs at each end of the gate, the horizontal rails or bars $c'$, which are pivotally connected at their extremities to the vertical end bars by through-bolts $c^2$, and the vertical central bars, $c^3$, arranged between the end vertical bars, and likewise pivoted to the horizontal bars or rails of the gate, as will be very readily seen.

D designates an endwise-moving locking-bar, which is arranged in a horizontal position between the two lower horizontal bars or rails of the gate, and this locking-bar is supported by means of inclined bars E, which are pivotally connected at their upper ends to the upper horizontal bar of the gate and at their lower ends to the horizontal locking-bar D, the pivots being formed by through-bolts and nuts $d$, as shown. These inclined bars E are arranged in pairs, and one bar of each pair is arranged on one side of the horizontal gate-bars, while the other bar of the pair is arranged on opposite sides of the said gate-bars, as will be very readily understood.

The gate is capable of a vertical tilting movement when upward pressure or a pull is exerted upon the front ends of the horizontal bars or the front end stile thereof, the horizontal rails or bars turning upon the through-bolts as pivots to permit the front end of the gate to be elevated to a higher point than the rear end thereof, which is hinged to the post A, as clearly shown in Fig. 2 of the drawings. The horizontal locking-bar normally rests upon or is connected with the upper edge of the lower horizontal bar of the gate, and the said bar is normally held or arranged parallel with the lower horizontal bar of the gate by means of the inclined bars or links E, which are of the same length, and pivoted to the upper horizontal bar of the gate at the same horizontal plane or line.

When the gate is raised or elevated at its free end by upward pressure or pull thereon by the hand, the links or inclined bars E are raised with the upper horizontal bar of the gate, to which they are connected, and thereby likewise elevate the locking-bar, and the locking-bar is thus governed and controlled by the gate-bars, to which it is connected by the intermediate links or bars E, as will be very readily understood.

In order to detachably connect the horizontal locking-bar to the lower gate-bar, I provide auxiliary locking mechanism, so that when the gate is elevated the locking-bar is adapted to hold the gate in its elevated position. In Figs. 1 to 4, inclusive, I employ a series of inclined pointed pins, F, that are rigidly affixed to the lower edge of the locking-bar, and depend therefrom, so that they will take into the upper edge of the lower horizontal rail of the gate. It will be seen that as the gate is elevated the locking-bar is moved upwardly with the horizontal bars, and when the upward pressure of the hand on the gate is released it will descend or fall slightly, so that the teeth or spurs in the upper locking-bar will take into the upper edge of the lower horizontal bar of the gate, and thus lock the latter against downward movement. As the series of spurs or teeth on the locking-bar engage the lower horizontal bar of the gate, the weight and strain of the latter is distributed over a large surface of the locking-bar and the horizontal bar of the gate, with which it engages, thereby effectually preventing the gate from sagging, and causing it to swing or move freely and easily on its hinges.

The locking-bar is automatically disengaged from the gate when the latter is elevated by the upward pull exerted thereon by the inclined bars or links, and when the gate reaches its desired elevation the locking-bar is likewise engaged with the gate by merely allowing the latter to descend slightly; but when it is desired to lower the gate, it is elevated slightly to permit the locking-bar to be disengaged from the gate-bar, in which position the locking-bar is held by the hand until the gate is lowered, or the desired height is reached to which it is desired to lower the gate.

In lieu of the spurs or teeth on the lower edge of the locking-bar, I may employ the plates or bars G. (Shown in Figs. 5, 6, and 7 of the drawings.) These plates or bars G are arranged one on each side of that horizontal gate-bar which is next above the locking-bar, and they are secured to said gate-bar by means of the bolts $g$, which are passed through the said plates above and below the said gate-bar. The normal position of these bars or plates when the gate is closed is that shown in Figs. 5 and 7. By reference to these figures it will be seen that the bars are placed or hung upon the gate-bar, so that they are inclined slightly rearward, and they are held in their inclined position by the pins $h$ on the locking-bar, which impinge against the forward edges of the bars, as shown. If the front end of the gate be now elevated, it is obvious that the lower ends of the bars will swing forward of their own weight, and will consequently follow the pins $h$ of the locking-bar D. It will thus be seen that the said pins $h$ constantly impinge against the front edges of the bars G, and when the gate has been elevated to the desired height the weight of the gate will be communicated through the links E and locking-bar D to the bars G. The result will be that the pins $h$, impinging against the bars G, will throw the lower ends of the same rearward, thereby causing the bolts $g$, passed through the upper ends of the said bars, to bind against the upper and lower edges, respectively, of the gate-bar, upon which the plates are hung, as will be understood from Fig. 6. The several parts will thus be locked together and the gate held in its elevated position.

In order to lower the gate, it is only necessary to move the upper ends of the bars G slightly rearward, or to move the locking-bar slightly forward, as will be readily understood.

It will thus be seen that I provide auxiliary locking mechanisms, which act in conjunction with the endwise-moving locking-bar and automatically engage one of the gate-bars to hold it at any desired elevation; and in lowering the gate it is only necessary to grasp one of the links E, to hold the endwise-moving bar out of contact with the lower bar or rail of the gate.

The front end of the endwise-moving locking-bar is extended to and beyond the front vertical bars of the gate when the latter is elevated, so that the front end of the locking-bar will enter the groove $b$ in the latch-post, and prevent the gate from swinging horizontally when it is in an elevated position, which is very desirable when small animals are passing beneath the gate.

H is an endwise-moving latch which slides upon one of the horizontal bars of the gate, and is adapted to be projected beyond the front end thereof, in order to fit into the vertical groove in the latch-post, and this latch has fixed stop-pins $i$ near the ends thereof, which are adapted to limit the movement or play of the same.

The front end of the endwise-moving locking-bar is retracted within the front vertical bars of the gate when the latter is in a horizontal position, and the front end of the latch H is extended beyond the gate, to prevent the latter from swinging open accidentally. When it is desired to open the gate while it is in its horizontal position, it is only necessary to retract the latch H from engagement with the groove in the post B, and then push against the gate. When the gate is elevated, the latch H cannot be projected beyond the front end of the gate a sufficient distance to engage the latch-post, owing to the stop-pins thereof, and hence I extend the front end of the endwise-moving locking-bar a sufficient distance to the front end of the gate, so that it will be projected into the groove in the latch-post when the gate is elevated, and thus prevent the gate from swinging horizontally, as will be very readily understood.

The operation of my invention is obvious from the foregoing description, taken in connection with the drawings.

Having thus fully described my invention, what I claim as new, and desire to secure by Letters Patent, is—

1. In a swinging gate, the combination, with the pivoted vertical and horizontal bars, of an endwise-moving locking-bar arranged above the lower horizontal bar of the gate and connected to one of the upper bars thereof by intermediate links, the lower edge of the said locking-bar being provided with a series of teeth or spurs, which are adapted to take into the lower horizontal bar of the gate when the latter is elevated, substantially as described, for the purpose set forth.

2. In a swinging gate, the combination, with the vertical end bars and the horizontal bars pivotally connected to the end bars, of an endwise-movable locking-bar arranged above one of the horizontal bars and having its front end terminating in the plane of the front end bar of the gate, to be projected beyond the said end bar when the gate is elevated, the links or bars pivoted to one of the horizontal bars, and the locking-bar and auxiliary locking mechanism for detachably connecting the locking-bar with one of the horizontal bars of the gate when the latter is elevated, substantially as described.

In testimony that I claim the foregoing as my own I have hereto affixed my signature in presence of two witnesses.

GEORGE P. PRICE.

Witnesses:
J. M. DACHTLER,
WM. GRIEST.